United States Patent

Tallian et al.

Patent Number: 4,557,613
Date of Patent: Dec. 10, 1985

[54] SPHERICAL ROLLER BEARING HAVING RECIPROCAL CROWNING FOR SKEW CONTROL

[75] Inventors: Tibor E. Tallian, Newtown Square; Colin G. Hingley, Radnor, both of Pa.

[73] Assignee: SKF Industries, Inc., King of Prussia, Pa.

[21] Appl. No.: 473,534

[22] Filed: Mar. 9, 1983

Related U.S. Application Data

[63] Continuation-in-part of Ser. No. 277,099, Jun. 25, 1981, abandoned, which is a continuation of Ser. No. 211,916, Dec. 1, 1980, abandoned, which is a continuation of Ser. No. 938,926, Sep. 1, 1978, abandoned.

[51] Int. Cl.$^4$ ................................. F16C 33/36
[52] U.S. Cl. ................................. 384/568
[58] Field of Search ............... 308/214, 215, 211, 218, 308/207 R, 202; 384/568, 565, 569

[56] References Cited

U.S. PATENT DOCUMENTS

| | | | |
|---|---|---|---|
| 3,527,513 | 9/1970 | Hewko | 308/215 |
| 3,963,285 | 6/1976 | Kellstrom | 308/215 |
| 3,990,753 | 11/1976 | Kellstrom et al. | 308/214 |
| 4,023,869 | 5/1977 | Caldwell | 308/214 |
| 4,065,191 | 12/1977 | Kellstrom | 308/214 |

*Primary Examiner*—Lenard A. Footland
*Attorney, Agent, or Firm*—Eugene E. Renz, Jr.

[57] ABSTRACT

A roller bearing having inner and outer raceways and a series of rollers interposed between the raceways characterized by a roller profiled in a predetermined manner to produce a residual frictional moment when the bearing is loaded which tends to control the direction of roller skew. To provide the residual frictional moment, the roller is designed with a profile contour having a predetermined variable curvature and the inner and outer raceways are designed with a constant radius of curvature. Thus designed, the frictional moment distribution on the roller is made to produce a positive skew resulting in decreased heat generation, less bearing friction and longer bearing life. The principle of the invention applies to bearing assemblies having barrel-shaped rollers as well as assemblies having hour-glass shaped rollers. In assemblies with barrel-shaped rollers, the geometric relationships are preferably as follows:

$$R_{r2} < R_o < R_{r1} < R_i$$

wherein $R_{r2}$ is the minimum radius of curvature of the roller profile;

$R_o$ is the radius of curvature of the outer raceway;

$R_{r1}$ is the maximum radius of curvature of the roller profile; and $R_i$ is the radius of curvature of the inner raceway.

The preferred geometrical arrangement for bearing assemblies having hour-glass shaped rollers is as follows;

$$R'_{r2} > R'_o > R'_{r1} > R'_i$$

wherein $R'_{r2}$ is the maximum radius of curvature of the roller profile;

$R'_o$ is the radius of curvature of the outer raceway;

$R'_{r1}$ is the minimum radius of curvature of the roller profile; and $R'_i$ is the radius of curvature of the inner raceway.

9 Claims, 40 Drawing Figures

PRESSURE DISTRIBUTION ON CONTACT AREA.

ELLIPTIC CONTACT AREA.

ROLLING POINTS

SLIP PATTERN IN CONTACT AREA.

FRICTION FORCE DISTRIBUTION ON CONTACT.

FRICTION FORCES WHICH GIVE RISE TO FRICTION MOMENT.

ARCUATE RACEWAY.

ELLIPTICAL ROLLER PROFILE
POINTS OF TANGENCY FOR RESPECTIVE ARCS

PRESSURE DISTRIBUTION ON CONTACT AREA.

ELLIPTIC PRESSURE DISTRIBUTION

ROLLING POINTS

SLIP PATTERN IN CONTACT AREA.

FRICTION FORCE DISTRIBUTION ON CONTACT

FRICTION FORCES WHICH GIVE RISE TO FRICTION MOMENT

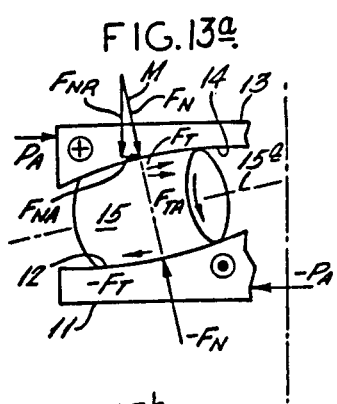
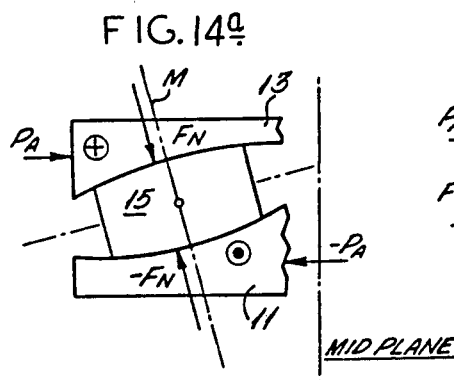
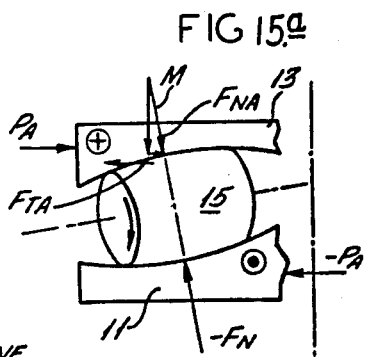
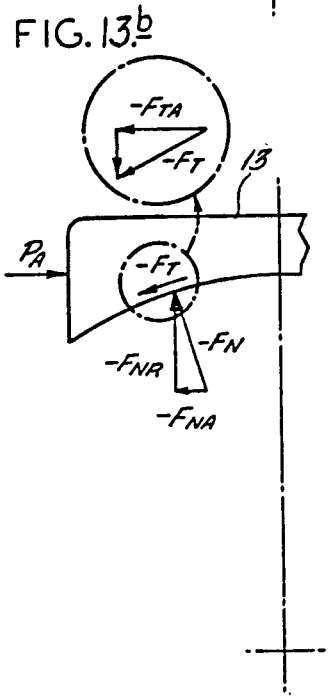
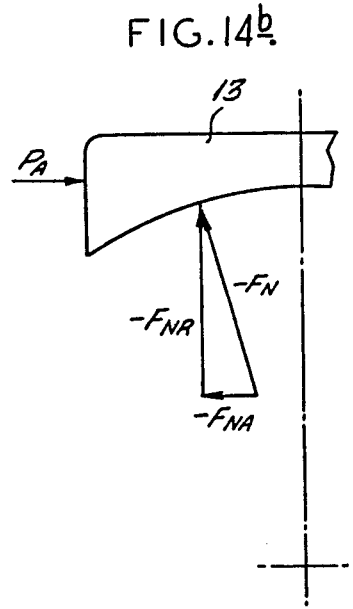
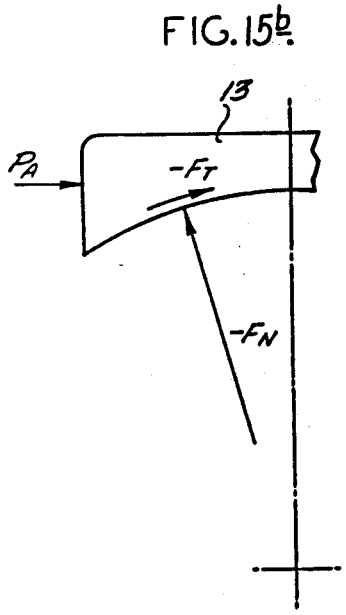
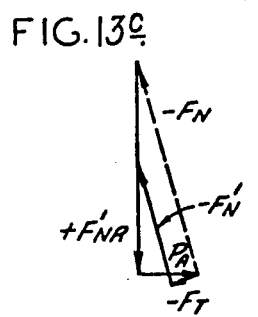
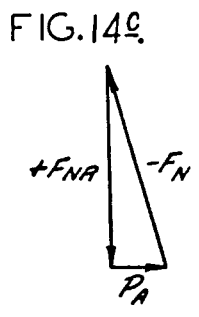
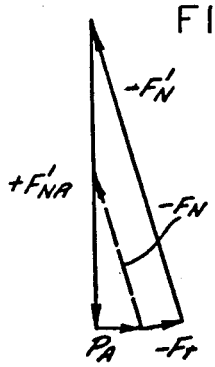
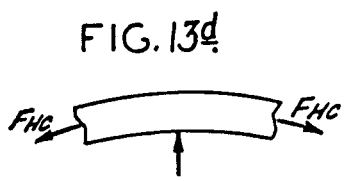
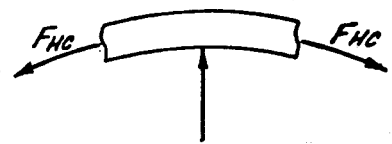

CONTACT BETWEEN ROLLING ELEMENT AND EITHER INNER OR OUTER RACEWAY

SPHERICAL ROLLER BEARING HAVING RECIPROCAL CROWNING FOR SKEW CONTROL

This application is a continuation-in-part of our prior application Ser. No. 277,099 filed June 25, 1981 for SPHERICAL ROLLER BEARING HAVING RECIPROCAL CROWNING FOR SKEW CONTROL, abandoned, which is a continuation of our prior application Ser. No. 06/211,916 filed Dec. 1, 1980 for SPHERICAL ROLLER BEARING HAVING RECIPROCAL CROWNING FOR SKEW CONTROL, now abandoned, which in turn is a continuation of our prior application Ser. No. 938,926 filed Sept. 1, 1978 for SPHERICAL ROLLER BEARING HAVING RECIPROCAL CROWNING FOR SKEW CONTROL, now abandoned.

BACKGROUND OF THE INVENTION

The present invention relates to roller bearings and particularly to structures for effecting roller skew control.

The concept of controlling roller skew is not new per se. This concept and the theory involved are fully discussed in Kellstrom et al U.S. Pat. No. 3,990,753 for ROLLER BEARING COMPRISING ROLLERS WITH POSITIVE SKEW ANGLE issued Nov. 9. 1976 owned by the assignee of the present application and incorporated herein by reference (referred to herein as "Kellstrom Patent"). In the Kellstrom Patent, cause of roller skewing in a spherical roller bearing is shown to be due to residual pivotal moments arising in the contacts with the raceways. Roller skew of small magnitude in a direction defined as positive, was shown to have beneficial effects on the bearing friction, heat generation and ultimately on fatigue life. Kellstrom described various techniques for controlling the pivotal moments to achieve positive skew. These techniques all involved raceway changes. For example, one technique involved adjusting the friction coefficient through surface roughness control. Another involved changes in the raceway conformities and a third skew control technique involved provision of relief areas in one or both raceways. In all of these techniques the roller profile was conventional. Even though it has been found that the Kellstrom techniques are all feasible and may be effectively utilized to achieve the desired positive skew control, it may be difficult as a practical matter to control them all sufficiently accurately in manufacture to assure the desired slightly positive skew attitude of the loaded rollers in all bearings over a wide range of load, speed and lubrication conditions as explained in more detail below. The present invention is designed to provide an alternate and somewhat more versatile means of achieving positive skew control by selectively varying the roller profile in a predetermined manner while maintaining a constant radius of curvature for the inner and outer raceways.

In the Kellstrom raceway profiling or recessing technique, it has been found that if the geometric relationships between the rollers and the raceways change during operation of the bearing under load the pressure distribution is altered and the theoretically designed static condition to produce the desired small positive skew will in fact produce gross positive skewing of the rollers or even negative skew. Both of these conditions are obviously undesirable. The relative geometric changes can occur for example, in a double row self-aligning spherical roller bearing where the inner and outer rings move relative to one another to accommodate for operating conditions and thus change the force relationships. Further the Kellstrom technique of selectively varying the coefficients of friction of the raceways has limitations because of the presently relatively limited choice of bearing materials. Moreover controlling friction coefficients by surface roughness is a difficult manufacturing technique. Furthermore, surface roughness changes during the life of the bearing by reason of wear which of course changes the skew control. Also, friction is strongly influenced by the degree of elasto-hydrodynamic film, thereby impacting the effectiveness of surface roughness as a means of skew control.

In accordance with the present invention, the roller profile is selectively varied and the geometric relationships between the roller and the raceways remain constant even during adjusting movements of the raceways relative to one another in a self-aligning bearing. It has also been found that the principle of the present invention compensates for adjustments in the bearing to take up normal internal clearances and also geometry changes which occur when the bearing is subjected to varying load conditions. In summary, the present invention provides a skew control technique wherein the geometric relationships between the roller and the raceways remain the same either during misalignment or under load. Accordingly, the desired moment relationship to provide the small positive skew remains essentially unchanged.

SUMMARY OF THE INVENTION

The principle underlying the specially profiled roller of the present invention is that the pressure field in the two raceway contacts can be tailored to suit the needs of roller skew control even though the raceway profile remains arcuate and thus it can still satisfy the requirement that the contact geometry is not influenced by bearing axial misalignment. This can be best illustrated by the following discussion directed to the pressure distribution and force analysis in a conventional spherical roller bearing.

When an arcuately profiled roller is loaded against an arcuately profiled raceway of lesser curvature (larger radius of curvature), the contact normal pressure distribution is elliptical in profile, the maximum pressure occurring on the line of centers of curvature, the pressure distribution also being symmetrical about this line, (see FIG. 1).

In a significant class of practical spherical roller bearings, (those with symmetrically profiled rollers) design considerations prevent the profile tangents at the point of initial contact from passing through the bearing apex (point of conic rolling). When the contacts are under load, and elastic distortion of the surfaces has taken place to establish a "footprint" of finite width, the deformed contact profile can only intersect a line from the apex at two points, $H_1$ and $H_2$, (see FIG. 2). When the bearing is in motion these two points represent regions in the contact "footprint" where the one surface is truly rolling on the other. All other regions of the contact above the line are slipping with respect to each other in one diraction, and the regions below the line are slipping in the opposite direction. (see FIG. 3). Slip, of necessity, induces friction forces on the surface in the directions of slip, (see FIG. 4). The actual position of the apex line and its intersection points $H_1$ and $H_2$ must be such that the resultant tangential friction force is zero. (This disregards lesser considerations of secondary contact friction effects, cage friction and lubricant squeeze film friction losses that modify this equilibrium statement slightly.) Graphically, the areas A and C together must equal area B in FIG. 4.

For convenience, the magnitudes of the slip friction forces in FIG. 4 are shown proportional to the normal contact forces as they would be under Coulomb friction conditions. Other frictionnormal force relationships can be assumed without invalidating the overall thesis.

Although the friction forces are in translational equilibrium, it is obvious that the asymmetry of $H_1$ and $H_2$ can produce a lack of moment balance about the center of contact "O". The magnitude of the resultant friction spin moment about "O" can be assessed graphically by subtracting balanced areas as shown in FIG. 5, resulting in a net clockwise moment for the case illustrated. A similar analysis of the contact of the same roller with the other raceway typically leads to a net spin moment in the opposite direction. The actual behaviour of the roller is thus a response to the difference between the spin moments arising at the two raceway contacts.

The foregoing arguments have considered the axis of the roller to be co-planar with the axes of the raceways. Once unequal friction moments arise, the response of the roller is to skew in the direction of the dominant contact friction moment. A further slip velocity is then developed at each contact in the direction of the apex line. These additional sliding velocities then modify the direction of the slip friction and, due to the change in orientation of the planes of principal curvature of the rollers, also modify the pressure distribution at the contact and thus the magnitude of the forces shown in FIG. 4 and thus alter the net friction moment in each contact. Whether or not an equilibrium skew angle exists where the friction moments are equal and opposite is dependent entirely on the geometry, loading and lubrication conditions prevailing at the two roller contacts.

Analysis has shown that conventional bearings of this type either have roller equilibrium at negative skew angles or are unstable in the negative direction with the roller skew attitude limited by the cage pockets.

Another class of self-aligning roller bearings utilizes asymmetrically profiled rollers, so that the line of centers is indeed tangent to the apex line at the nominal point of contact, and consequently the Coulomb sliding friction forces depicted in FIG. 4 are in both translational and moment balance, and thus no skewing moments arise at such contacts. However, the geometry of such bearings prevents the normal forces from the two roller contacts being collinear and thus a third contact force is required to provide roller equilibrium. This reaction force is provided by a flange attached to one raceway or the other as shown in FIG. 6. In either configuration the flange contact inevitably has a sliding velocity component which gives rise to a tangential friction force on the roller end which in turn induces a skewing moment on the roller, again in the negative direction. Whether this negatively skewing force can establish an equilibrium negative roller attitude depends not only on the raceway contact but also on the geometry of the roller end and the mating flange. The absence of a resultant spin moment in the asymmetrical contacts described above is only approximately true. More realistic analysis predicts that an asymmetric field of the type shown in FIG. 4 is again developed and skewing moments arise. Thus even the asymmetric roller class of bearing suffers from unwanted negative skew tendencies.

TECHNICAL SOLUTION

The above discussions outline the cause of roller skew and show that in all current bearings the resultant friction moment from all the roller contacts (either two or three) causes an undesirable negative roller skew. However, in each case, one contact produces a net skew moment in the desired positive direction, and it is the object of the Kellstrom Patent and this one to enhance this positive skew moment with respect to the negative moments, so that equilibrium is achieved at a preselected small positive roller skew attitude.

The friction moment in a contact may be modified by varying either the magnitude of the slip forces themselves or by changing their distribution with respect to the center of contact "O". The former is primarily achieved by deliberately increasing the effective coefficient of friction at one contact; and the latter primarily by redistributing the normal contact forces which give rise to the friction forces. It it this latter approach which is the subject of this invention.

As described earlier, arcuate profiles in contact give rise to elliptical normal force distributions. This system constraint can be removed by making one of the contacting surfaces having a varying profile curvature. Perhaps the simplest example of such a profile is an ellipse although the feasibility is not restricted to a single class of curves. The only practical constraints are continuity of slopes (no lines of infinite curvature) to avoid local stress concentrations; and manufacturability considerations.

LOCATION OF PROFILE

From a stress redistribution point of view, the non-arcuate profile may be applied to either of the raceways or to the roller Overall bearing performance will dictate the most appropriate choice. Consider the typical spherical roller bearing configuration shown in FIG. 7. In this case the outer raceway contact develops the positively directed skew moment and the inner raceway the negative skew moment (reference Kellstrom). Positive skew of the rollers could be achieved either by increasing the outer raceway moment or decreasing the inner raceway moment or by a combination of the two actions. In this bearing, self alignment properties dictate that the outer raceway be spherical. Any profile modifications to this raceway would disturb the sphericity and also be subject to a position error of up to 3° with respect to the roller, as the outer ring is misaligned in service.

Profile adjustment can be made to the inner raceway (Kellstrom Patent) such that the width of the pressure profile and hence the negative skewing moment is reduced. However, the maximum contact pressure is increased. Also, as loading directions vary, the axial position of the roller on the inner raceway varies, thus leading to position errors of the inner race profile with respect to the roller.

If the profile change is made to the roller, in the manner described herein, then the desired skew moment equilibrium can be achieved by beneficial adjustment of the normal force distributions in both contacts, and consequently in the resultant frictional slip fields.

AN EXAMPLE

For illustration, consider the normal stress distributions resulting from the loaded contact of rollers of differing ellipticity with an arcuate raceway of a specified radius of curvature (FIG. 8). Curve #1 is the special case of an ellipse with equal axes, a circle, which gives rise to the familiar elliptic pressure distribution. Curve #2 is that of an ellipse whose maximum radius of curvature is the same as that of the contacting raceway. This curve gives a flat centered pressure distribution. Curves 3 and 4 illustrate increasing bimodality of the pressure distribution as the ellipticity is increased. Referring back to the sequence of FIGS. 1 to 5, the construction is repeated in FIGS. 9 to 12 so that one can see that the widening 'footprint' associated with the greater roller ellipticity will give rise to a greater skew moment about the contact center line. However, if the two raceways were of a common curvature, both raceway friction moments would be enhanced to a similar degree and so this condition alone is not sufficient to achieve the skew control objective.

In FIG. 13 the effect of varying the radius of curvature of a raceway loaded against an elliptical roller profile is shown to influence the contact pressure distribution. Thus, if the inner raceway is made with a somewhat greater radius of curvature than the outer raceway sphere radius, the desired difference in contact pressure distributions can be obtained and consequently roller skew control achieved. A particular benefit of this approach as highlighted in FIG. 13 is that the maximum stress at the inner raceway (always the most severely stressed and thus fatigue sensitive) is not sharply peaked, but can remain well distributed, and the tendency towards a bimodal stress field is confined to the outer raceway where stresses are inherently lower due to the conforming nature of that contact.

In the above example, the changes in pressure profiles alone have been considered. Of course, the translational equilibrium of the slip forces must also be taken into account. The relocations of the rolling points $H_1$ and $H_2$ are relatively minor within the range of practical profile changes, but even so, their displacements tend to augment the desired moment adjustment at the respective contacts.

In this example, where the roller contacts the interior surface of a sphere, the roller profile radius of curvature decreases towards the roller end, or in other words, the contact region of the roller profile is located near the intersection of the curve with the minor axis of the ellipse. The illustrated pressure profiles of FIGS. 8 and 13 are symmetrical; the center of curvature of the raceway being assumed to lie on the minor axis of the ellipse. This is not a prerequisite.

In a bearing configuration wherein the rollers contact the exterior surface of a sphere, the rollers being hourglass shaped, the pressure profile adjustments discussed above can be achieved by utilizing a roller profile in which the radius of curvature increases towards the roller ends. Such a profile exists adjacent the intersection of an ellipse with its major axis.

With the foregoing in mind, it is a primary object of the present invention to provide an improved self-aligning roller bearing which operates with a minimum of friction and which has a maximum service life.

It is another object of the present invention to provide a novel self-aligning bearing which is wear resistant and which can be manufactured readily.

As a further object, the present invention provides a unique roller bearing with rollers each having a profile with a variable curvature for cooperating with raceways having profiles of constant but different radii of curvature to cause the rollers to assume non-negative skew angles during operation of the bearing while providing the bearing with self-aligning capabilities.

More specifically, in the present invention a bearing having inner and outer rings with inner and outer raceways and a series of rollers interposed between the raceways is provided with a roller profile having a curvature which is variable and in one form non-increasing from a reference datum extending transversely through the roller. The inner and outer raceways have profiles with constant radii of curvature, but the radius of curvature of the inner raceways profile is greater than the radius of curvature of the outer raceway profile. The radius of curvature of the roller profile adjacent its longitudinal plane of symmetry may be greater than the radius of curvature of the outer raceway profile in the same plane and less than the radius of curvature of the outer raceway profile at locations on opposite sides on the reference datum. The bearing constructed in accordance with these geometrical design considerations has self-aligning capabilities and operates with minimum friction and maximum service life, and the bearing can be mass produced readily.

These and other objects, features and advantages of the present invention should become apparent from the following description when taken in conjunction with the accompanying drawings, in which.

Figure 1:
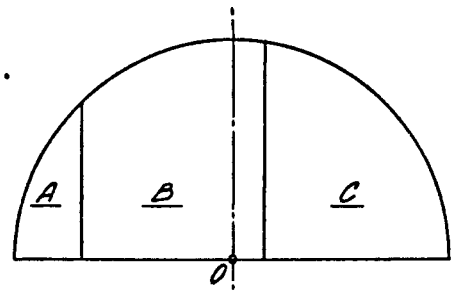
FIGS. 1, 3, 4 and 5 illustrate the general sliding pattern and friction forces in an angularly oriented roller under load.
Figure 3:
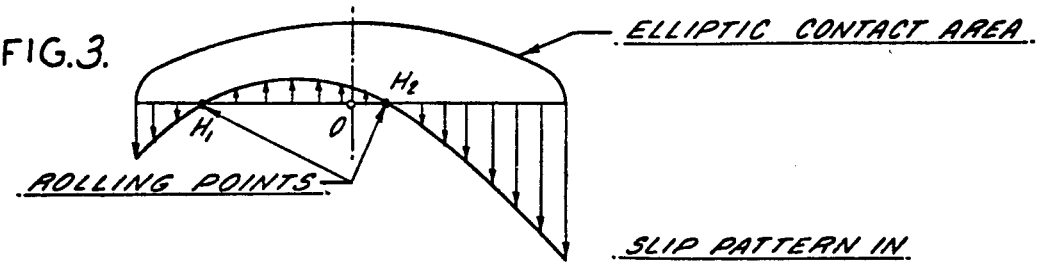
Figure 4:
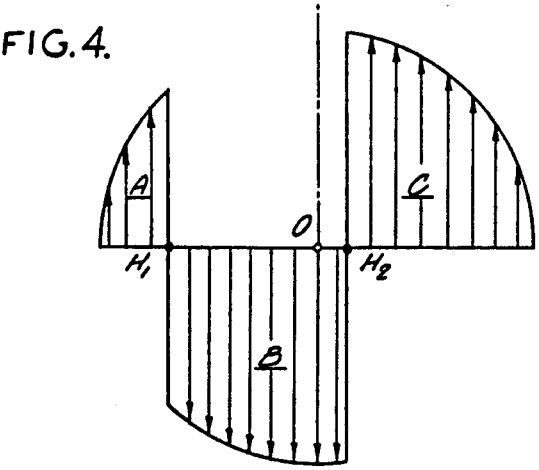
Figure 5:
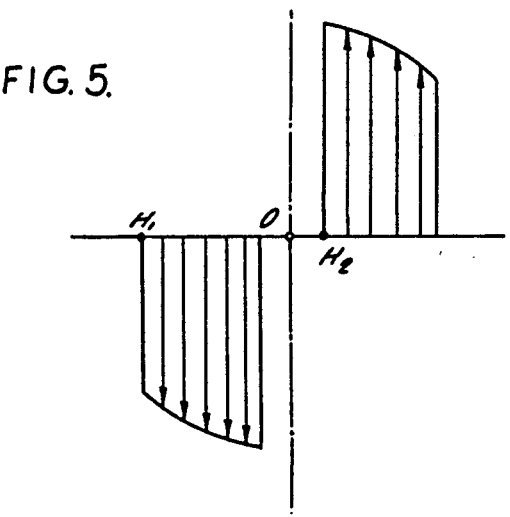
Figure 2:
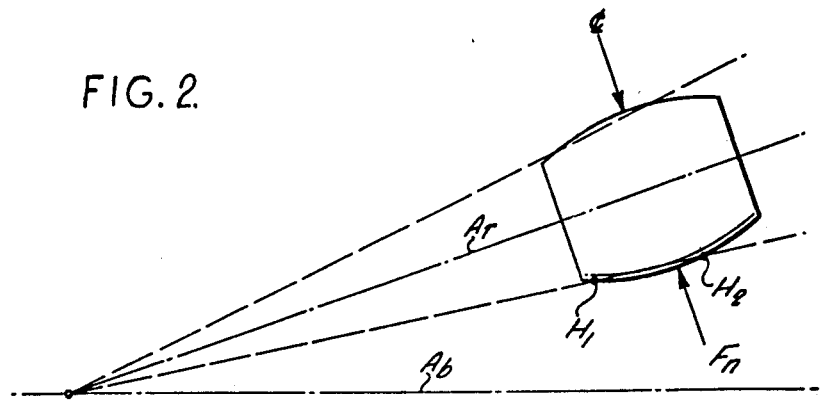
FIG. 2 is a schematic showing of an angularly oriented, loaded roller of a spherical roller bearing showing the points of pure rolling.
Figure 6:
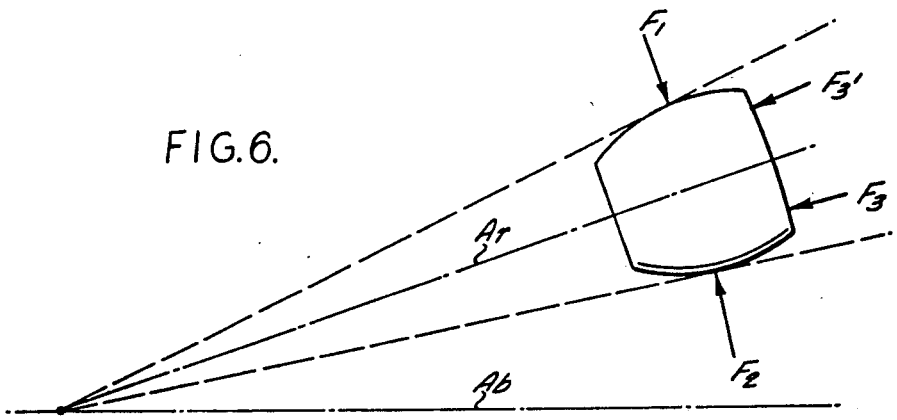
FIG. 6 is of use similar to FIG. 2 showing the flange reaction forces and the raceway forces on the roller.

FIGS. 9–12 inclusive are views similar to FIGS. 3, 4 and 5 showing the greater skew moment about the contact center line as the roller ellipticity is increased.

Figure 13:
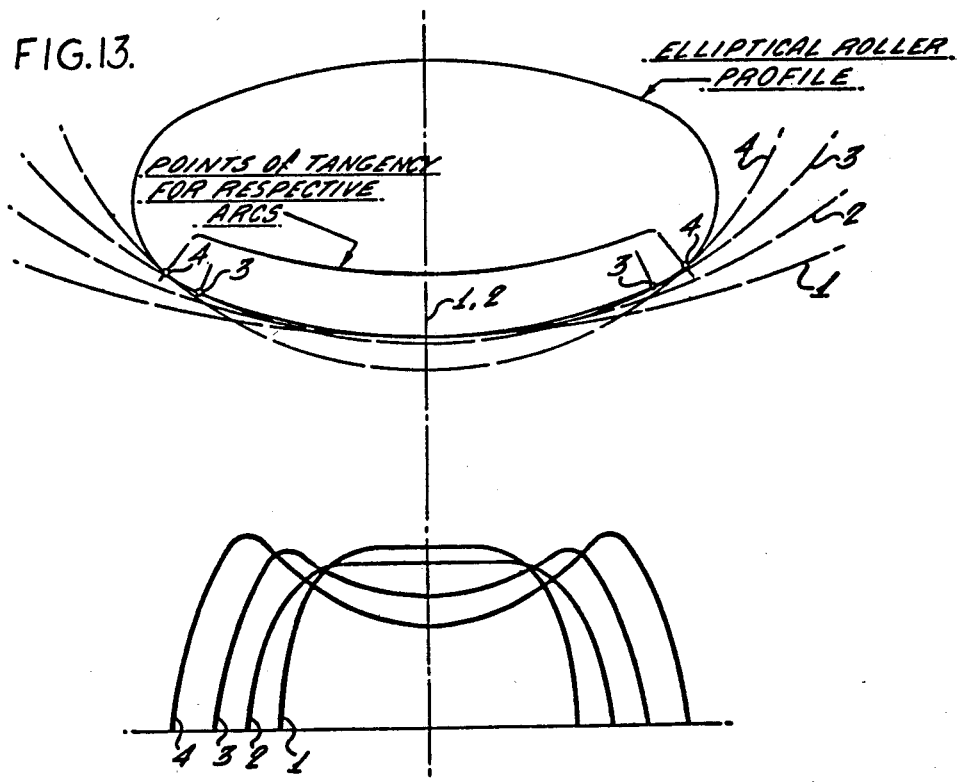
Figure 9:
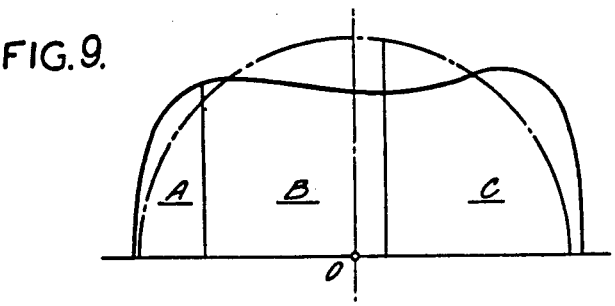
Figure 10:
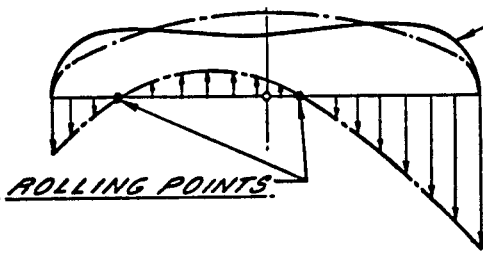
Figure 11:
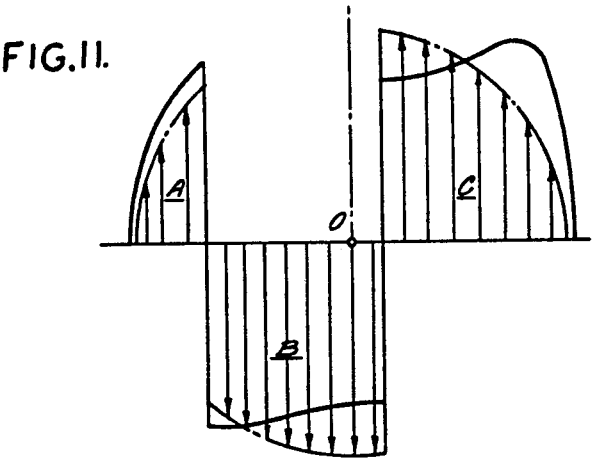
Figure 12:
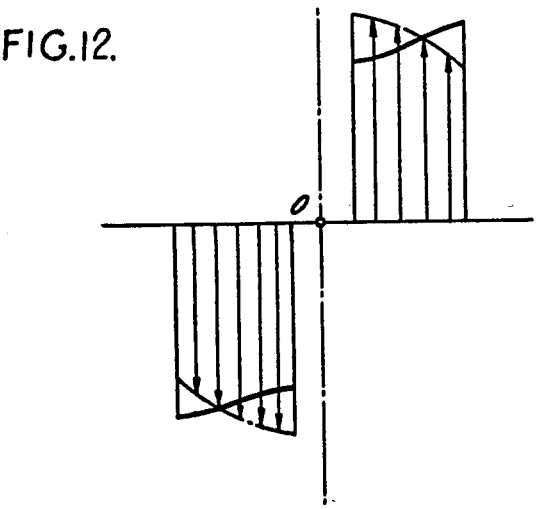

FIG. 13 is a schematic view showing the effect of varying the radius of curvature of a raceway loaded against an elliptical roller profile particularly as it influences the contact pressure distribution.

Figure 16A:
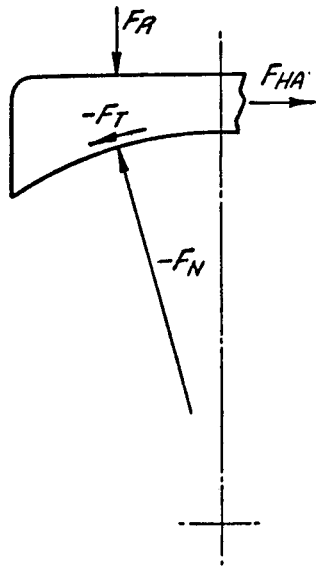
Figure 17A:
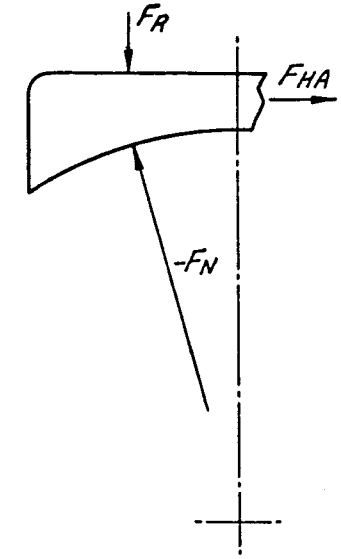
Figure 18A:
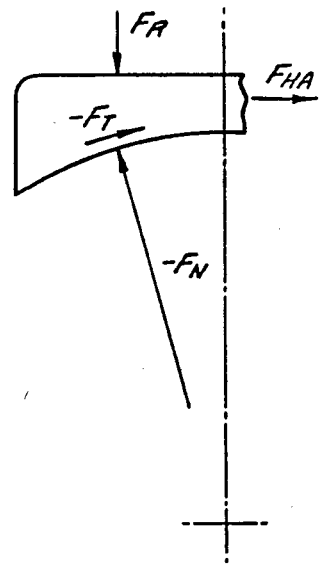
Figure 16B:
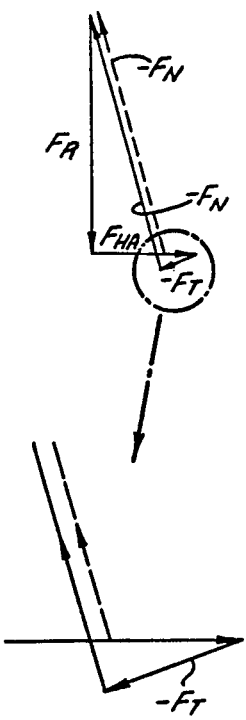
Figure 17B:
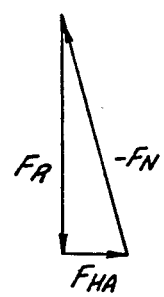
Figure 18B:
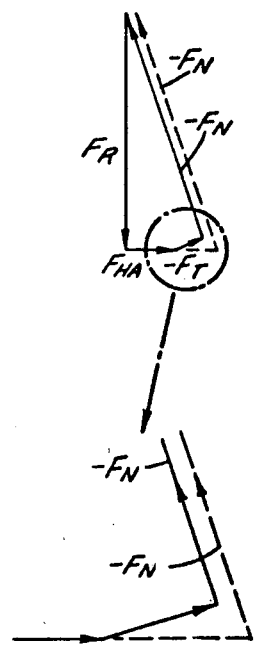
Figure 19A:
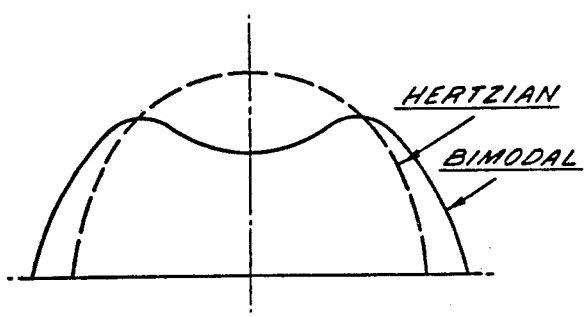
Figure 20A:
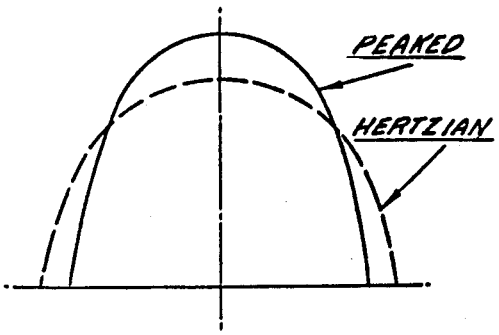
Figure 19B:
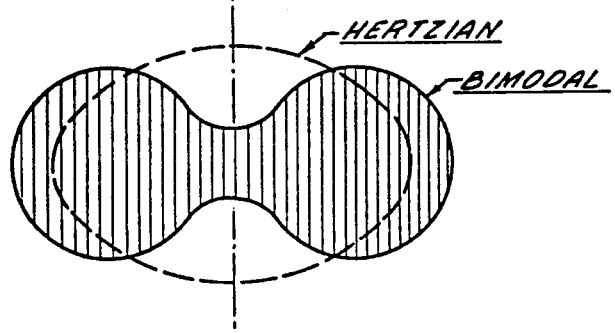
Figure 20B:
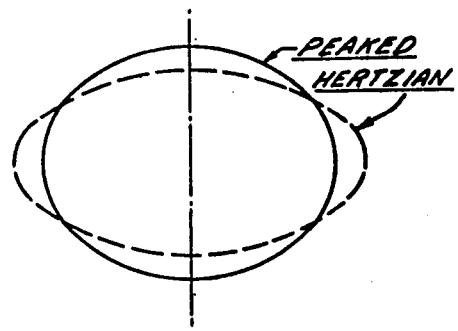
Figure 21:
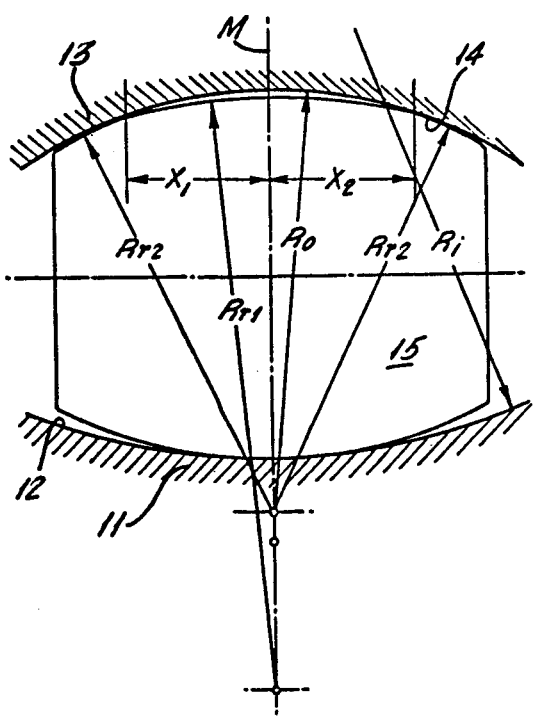
Figure 22:
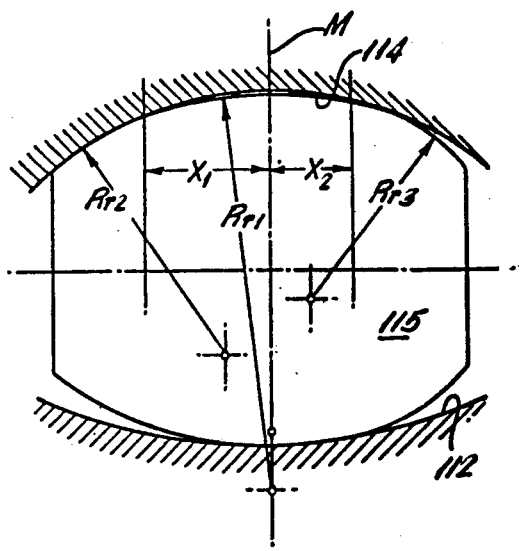
Figure 23:
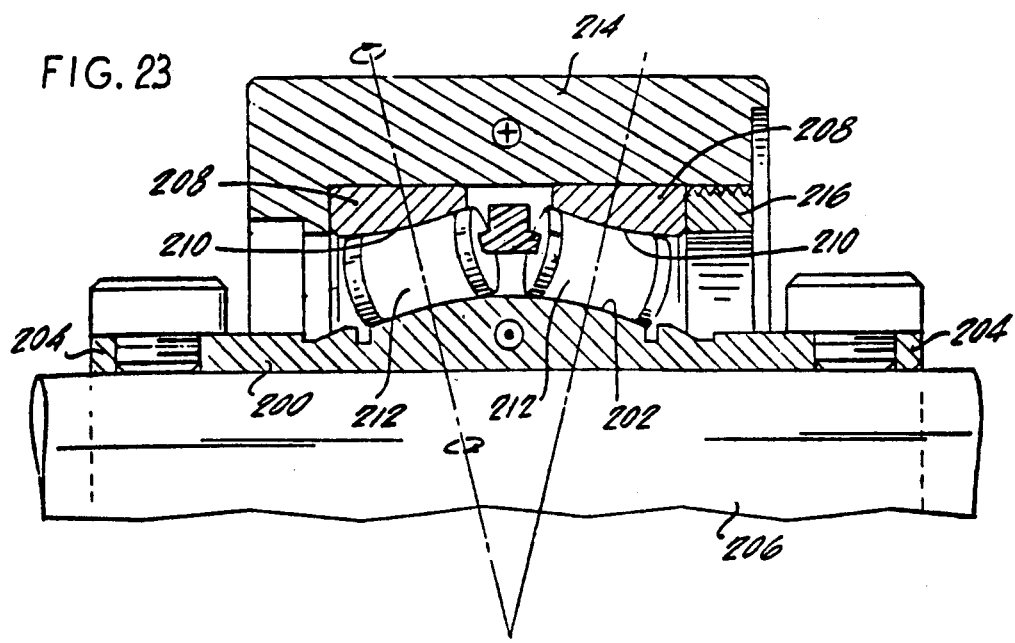
Figure 24:
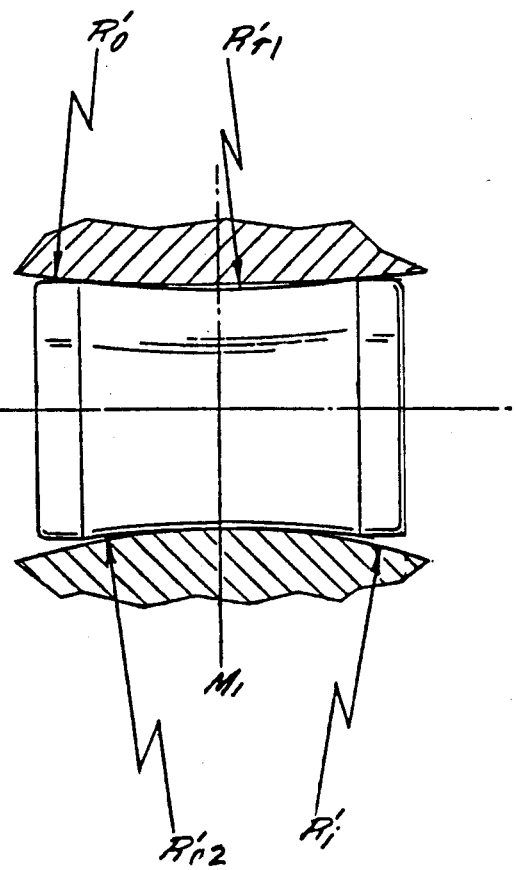
Figure 25:
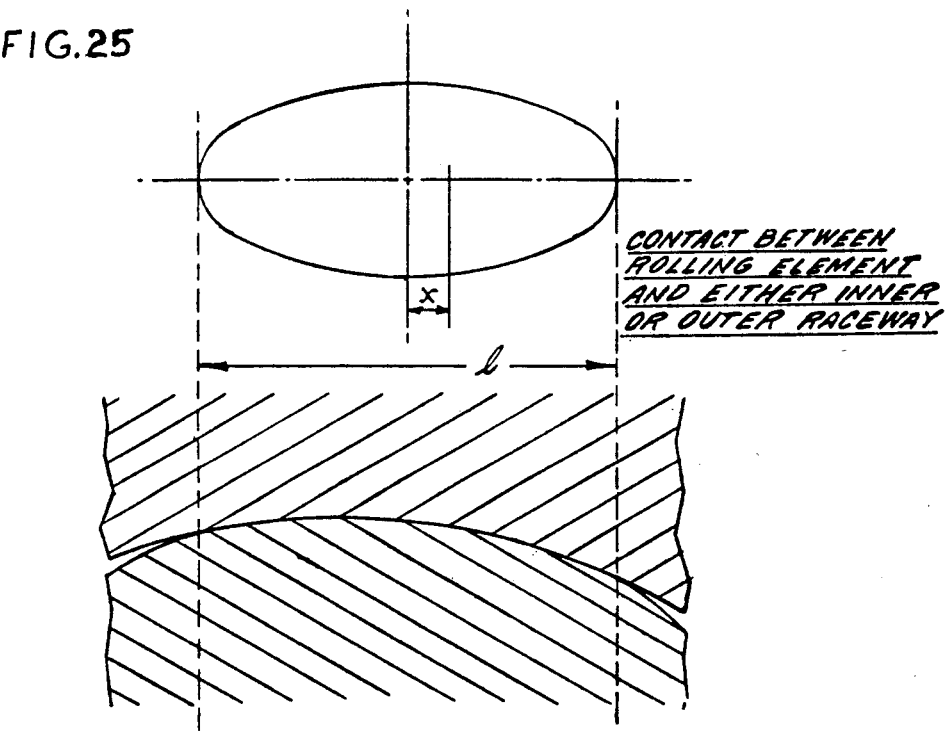

FIGS. 13a, 14a and 15a are fragmentary views schematically illustrating certain forces which are developed in axially-loaded bearings operating with their rollers disposed at positive, zero and negative skew angles, respectively;

FIGS. 13b, 14b and 15b are simplified free body diagrams illustrating the relationship of the forces developed in the bearings illustrated in FIGS. 13a, 14a and 15a, respectively;

FIGS. 13c, 14c and 15c are simplified vector diagrams showing force equilibria for a fragment of the outer ring under the loading of a single roller, comparing the effects of operation of the bearings of FIGS. 13a, 13b and 13c at positive, zero and negative roller skew angles, respectively;

FIGS. 13d, 14d and 15d are schematic diagrams illustrating the relative magnitudes of the hoop stresses in the outer rings of the bearings illustrated in FIGS. 13a, 14a and 15a, respectively, which furnish reaction to the forces $F_{NR}$ in the diagrams 13c, 14c and 15c;

FIGS. 16a, 17a and 18a are simplified free body diagrams similar to FIGS. 13b, 14b and 15b but illustrating the force relationships developed in the bearings under pure radial loads;

FIGS. 16b, 17b and 18b are simplified vector diagrams comparing the effects of operation of the bearings of FIGS. 16a, 17a and 18a at positive, zero and negative skew angles, respectively;

FIGS. 19a and 19b illustrate graphically a bimodal pressure distribution in the outer ring contact of the roller bearing configuration chosen to illustrate the application of the present invention;

FIGS. 20a and 20b illustrate graphically a peaked unimodal pressure distribution in the inner ring contact of the roller bearing configuration chosen to illustrate the application of the present invention;

FIGS. 21 and 22 are views illustrating certain geometrical relations which are present in bearings embodying the present invention;

FIG. 23 is a sectional view of another embodiment of roller bearing in accordance with the present invention;

FIG. 24 is a fragmentary view showing the geometric relations which are present in the bearing according to the embodiment of FIG. 23; and FIG. 25 illustrates graphically pressure distribution at the contact zone of two bodies.

DESCRIPTION OF PREFERRED EMBODIMENTS

Figure 7:
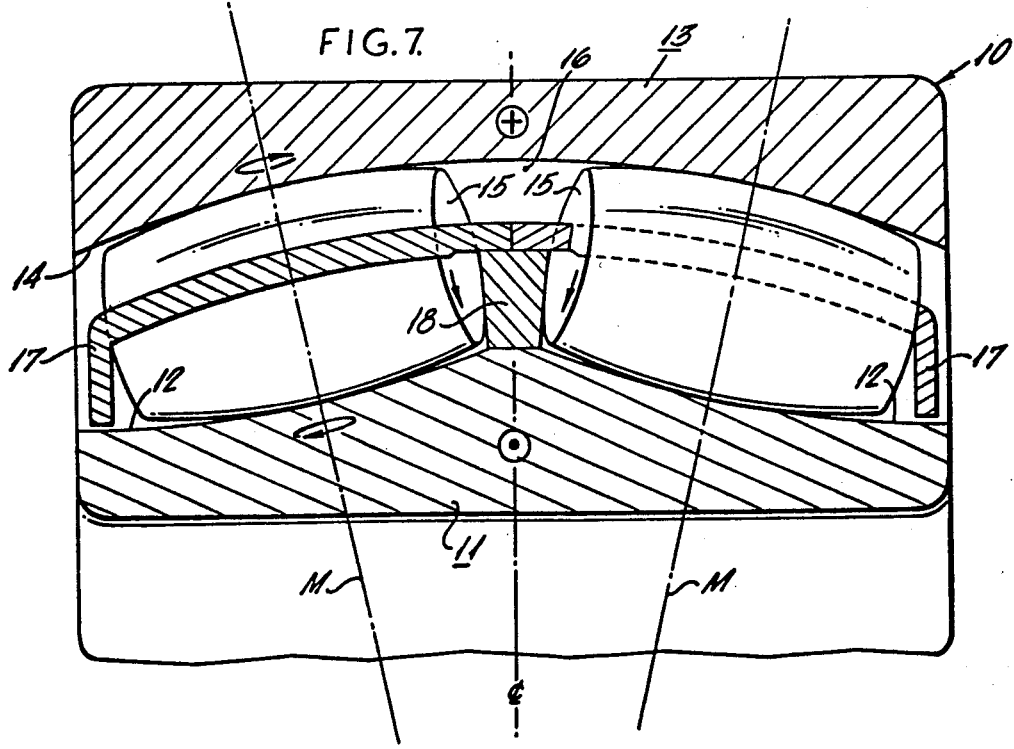
FIG. 7 is a sectional view through a typical double-row spherical roller bearing.
Figure 8:
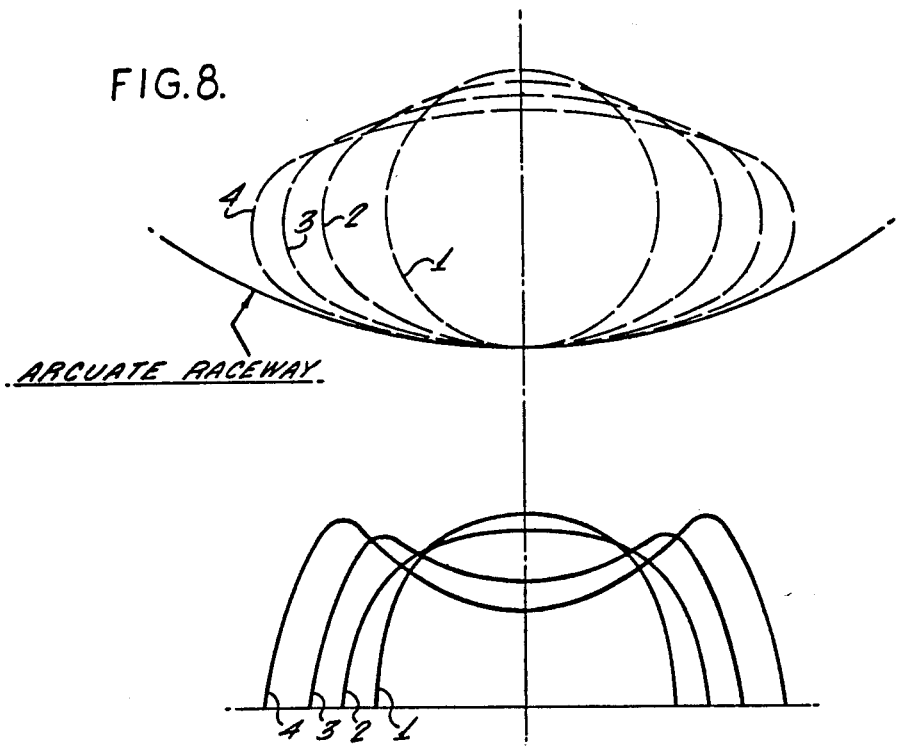
FIG. 8 is a schematic showing the normal stress distributions resulting from the loaded contact of rollers of differing ellipticity with an arcuate raceway of a specified radius of curvature.

Referring now to the drawings, FIG. 7 illustrates a bearing 10 embodying the present invention. The bearing 10 comprises an inner ring 11 having raceways 12, 12, and outer ring 13 having a raceway 14 confronting the raceways 12, 12 and a series of rollers or rolling elements 15, 15 rotatably mounted in the annular space 16 between the inner and outer raceways. As best seen in FIG. 7, the rolling elements 15, 15 are disposed in end-to-end relation in a pair of axially-spaced rows between the rings 11 and 13. The rolling elements 15, 15 are normally separated and offset circumferentially in the annular space 16 by means of cages 17, 17.

The bearing 10 has self-aligning capabilities. For this purpose, the outer ring 13 is designed so that it can pivot about an axis transverse to the rotational axis of the inner ring 11. To this end, the outer raceway 14 is designed with a profile having a constant radius of curvature $R_0$ (FIG. 21) and the inner ring 11 is designed so that the raceways 12, 12 are symmetrical with respect to a center line $C_L$ drawn radially from the rotational axis A of the bearing 10. The inner raceways 12, 12 incline upwardly toward the center line $C_L$ of the bearing from opposite axial ends thereof. As is conventional in some double-row spherical roller bearings, a guide ring 18 is mounted on the inner ring 11 between the two rows of rollers 15, 15 to separate the rollers 15, 15 endwise from one another.

According to the present invention, the bearing 10 is designed to operate with its rollers 15, 15 at non-negative skew angles.

A skew angle is the angle of deviation of the rotational axis of the roller from a plane passing through the roller and the rotational axis of the bearing. The skew angle can be positive, negative or zero. The skew angle is defined as being positive when the friction force components acting on the roller in the axial direction are so directed that they add onto or are codirectional to the axial component of the normal contact force acting on the roller at the same contact. As discussed in the aforementioned Kellstrom Patent, and as will become more fully apparent hereinafter, operation of the bearing with the rollers disposed at positive skew angles within a predetermined range minimizes overall friction within the bearing and increases the service life of the bearing.

In one embodiment of the Kellstrom Patent, the outer raceway is provided with a shallow relief adjacent the middle of the roller, and the inner raceway is provided with a pair of reliefs adjacent opposite ends of the roller. These raceway modifications cause a bimodal pressure distribution (FIG. 19a) to occur between the outer raceway and the roller and a peaked unimodal pressure distribution (FIG. 20a) to occur between the inner raceway and the roller. These pressure distributions create friction force moments which pivot the roller into a positive skew angle. As noted above, in some applications such as double row self-aligning spherical roller bearings, the force relationships may change under different operating conditions thus altering the pressure distribution in some instances to an extent to negatively skew the rollers. Some forms of roller contouring in accordance with the present invention produce essentially the same bimodal-unimodal pressure distribution discussed above. However, the relative pressure distribution remains essentially the same to maintain positive skew even under varying operating conditions.

Before describing specific embodiments of the present invention, it may be helpful to analyze more specifically negative and positive skew.

When a bearing operates with its rollers skewed at a positive angle, friction forces caused by the relative sliding motion between the surface of the raceway and the surface of the roller develop in the load zone between the rolling element and the inner and outer raceways. As an aid to understanding this phenomenon, reference is made to FIG. 13a wherein the outer ring 13 may be visualized as moving out of the plane of the paper; the inner ring 11 may be visualized as moving into the plane of the paper; and the roller 15 may be visualized as rotating about its axis 15a in the direction indicated by the arrow. Thus, the rolling element 15 may be regarded as rolling in a foreward direction out of the plane of the paper at its contact with the outer raceway 14. Because of the skew of the roller 15, however, the direction of rolling motion of the roller 15 is not perpendicular to the plane of the paper. Rather, the rolling motion has a directional component which diverges from a plane drawn perpendicular to the axis of the inner and outer rings at the median M of the roller 15. Since the outer ring 13 can only sustain motion about the bearing axis A, its motion at its contact with the roller 15 is precisely perpendicular to the plane of the paper. As a result, the outer raceway 14 must slip over the surface of the roller 15 in a direction toward the plane M. This motion creates a friction force $F_T$ which is shown acting on the roller 15 and which can be resolved into a component $F_{TA}$ directly axially of the bearing 10. By similar reasoning, a sliding friction force of the same magnitude but opposite in direction $-F_T$ is developed on the bottom of the roller 15 at its contact with the inner raceway 12.

When an external axial load $P_A$ is applied to the outer ring 13, an equal but opposite reaction load $-P_A$ is applied to the inner ring 11. These loads cause a normal force $F_N$ to be applied to the roller 15 by the outer raceway 12. As best seen in FIG. 13a, the normal force $F_N$ has a radial component $F_{NR}$ and an axial component $F_{NA}$. When the axial component $F_{NA}$ of the normal force $F_N$ is co-directional with the axial component $F_{TA}$ of the friction force $F_T$ acting on the roller 15, the roller is defined as being at a positive skew angle. Of course, a similar analysis holds for the forces at the inner raceway 12 resulting from the reaction force $-P_A$ applied leftward to the inner ring 11 to counteract the external load $P_A$ applied rightward to the outer ring 13.

In the bearing illustrated in FIG. 15a, the roller 15 is disposed at a negative skew angle. As seen therein, the outer ring 13 slips relative to the roller 15 and causes the sliding friction force $F_{TA}$ to be directed opposite the corresponding force $F_{TA}$ in the bearing of FIG. 13a with its roller at a positive skew angle.

As an aid in understanding the advantages realized in a bearing operating with its rollers at a positive skew angle (as compared with zero and negative skew angles) reference is made to FIGS. 13b, 14b and 15b which are free body diagrams of the various forces acting on the outer ring. For purposes of illustration, the various forces are referenced to the centerplane M of the roller even though, as will become apparent hereinafter, the forces do not strictly act at such location in the bearing of the present invention, due to the bimodal pressure distribution which exists at the outer raceway.

Considering first the bearing illustrated in FIG. 14a operating with its roller at a zero skew angle, it may be seen in FIG. 14b that the axial external load $P_A$ gives rise to a normal force $-F_N$ which has an axial component $-F_{NA}$ acting to balance the force $P_A$. The normal force $-F_N$ also has a radial component $-F_{NR}$. This force balance is illustrated in FIG. 14c.

Considering now the bearing of the present invention illustrated in FIG. 13a operating with its roller at a positive skew angle, it may be seen in FIG. 13b that the axial external load $P_A$ gives rise to the normal force $-F_N$ which acts on the outer ring. The normal force $-F_N$ has axial and radial components $-F_{NA}$ and $-F_{NR}$, respectively. In addition, the friction force $-F_T$, discussed earlier, acts on the outer ring in the direction opposite the external load component $P_A$.

The effect of the friction force $-F_T$ on the force balance in the bearing is best seen in FIG. 13c wherein the friction force $-F_T$ is vectorially subtracted from the external load vector $P_A$. The line of action of normal force vector $-F_N$ is drawn parallel to the normal force vector $-F_N$ (indicated in broken lines) and to the tip of the friction force $-F_T$. The resulting normal force $-F_N'$ (indicated in full lines) is considerably smaller than the force which is applied to the outer ring by a roller at a zero skew angle. Compare FIGS. 13c and 14c. The lower normal force has the effect of increasing the fatigue life of the bearing. Outer ring hoop stresses are also reduced. Compare FIGS. 13d and 14d.

The bearing which operates with its roller at a negative skew angle has higher hoop stresses and a shorter fatigue life than the bearing operating with its rollers skewed at possitive or zero skew angles. This may be seen from a comparison of FIGS. 13c, 14c and 15c. As illustrated in FIG. 15b, the friction force $-F_T$ applied to the outer ring by the roller acts in the same direction as the axial external load $P_A$. As a result, the friction force $-F_T$ is added vectorially to the axial load component $P_A$ in FIG. 15c. The resulting normal force vector $-F_N'$ (indicated in full lines) is therefore considerably greater than the normal force vector $-F_N$ corresponding to zero skew (indicated in broken lines). Hence, the fatigue life of the bearing is reduced accordingly. Compare FIGS. 14d and 15d.

The above analysis applied to bearings under pure thrust load. When a bearing (constructed within conventional small bearing contact angles) operates with its rollers at positive skew angles and is subjected to pure radial loads, insignificantly greater normal forces are produced in the bearing, as compared with a similar bearing operating with its rollers at a zero skew angle. In a similar bearing operating with its rollers at negative skew angles, an insignificantly smaller normal contact force is developed as compared with a bearing operating with its rollers at zero skew. This may be seen by reference to FIGS. 16b, 17b and 18b, which illustrate forces in a radially loaded bearing corresponding to the roller skew angles illustrated in FIGS. 13a, 14a and 15a, respectively.

Unlike axially-loaded bearings, bearings under pure radial loads do not have significant hoop stresses in their outer rings. Rather, outer rings of such bearings are internally stressed in the axial direction between the half sections of the outer ring overlying each row of rollers. This relationship of external loads to internal forces and stresses for positive, zero and negative roller skew conditions is illustrated in the free body diagrams of FIGS. 16a, 17a and 18a.

As best seen in FIGS. 16b, 17b and 18b, pure radial loads cause the axial stresses $F_{HA}$ between the ring half sections to vary, depending on roller skew angle. For instance, as illustrated in FIG. 17b (zero skew angle) the axial stress is of a predetermined magnitude indicated by the vector $F_{HA}$. The same axial stress $F_{HA}$ is greater in FIG. 16b due to the friction force $-F_T$ caused by the positive skew angle of the roller. In contrast, the same axial stress $F_{HA}$ is smaller in FIG. 18b due to the friction force $-F_T$ caused by the negative skew angle of the roller. By comparing FIGS. 16b, 17b and 18b, it may be seen that the magnitude of the normal force $-F_N$ under positive skew conditions is slightly greater than that under zero skew conditions, and the normal force $-F_N$ under negative skew conditions, is slightly less than that under zero skew conditions. Thus, for pure radial loads, bearings designed to operate with rollers at a positive skew angle do not realize the significant advantages realized when operating under pure axial loads.

When the external load on a bearing is a combination of radial and axial load components, operation of the bearing with its rollers at positive skew angle reduces normal contact forces which arise predominately from the axial load component. Because of the small contact angle (angle of inclination of the roller axis with the bearing axis) of most conventional double row spherical roller bearings, this advantage exists as long as the ratio of the axial load component to radial load component is greater than about 1:5.

Having now discussed the broad general concept of the present invention, attention will now be directed to a specific bearing incorporating preferred embodiments of contoured rollers. In accordance with the present invention, the rollers are profiled in a manner defining a predetermined variable non-constant curvature and the inner and outer raceways are formed with curvatures of constant radius.

Referring now to FIG. 21, a specific embodiment of the present invention is illustrated which is a greatly enlarged, simplified view of the geometrical relations present in the bearing, it may be seen that the outer raceway 14 has a constant, in the present instance, finite radius of curvature $R_o$, and the inner raceway 12, has a constant, in the present instance, finite radius of curvature $R_i$. The radius of curvature $R_i$ is greater than the radius of curvature $R_o$. Each roller 15 has a profile with variable curvature which is, in the present instance, increasing (the radius of curvature is decreasing) with distance from a reference datum M defined by a radial line at the lengthwise median of the roller 15.

In the illustrated embodiment, the variable curvature of the profile of the roller 15 comprises radii of at least two different magnitudes. One radius of curvature $R_{r2}$ applies to the portions of the roller profile outboard of the reference datum M adjacent the ends of the roller. The radius of curvature $R_{r2}$ merges with the radius $R_{r1}$ at the locations $X_1$ and $X_2$ which are located equidistant from the roller median M. The radius of curvature $R_{r1}$ is less than the radius of curvature $R_i$ of the inner raceway profile but is greater than the radius of curvature $R_o$ of the outer raceway profile. The radius of curvature $R_{r2}$ is less than the radius of cruvature of the outer raceway $R_o$. In other words, the radius of curvature of the inner raceway profile $R_i$ exceeds the radius of curvature of the roller everywhere along its length (including the zone at the roller median M) and the radius of curvature $R_o$ of the outer raceway profile is less than the radius of curvature $R_{r1}$ of the roller profile at the median M but greater than the radius of curvature $R_{r2}$ of the roller profile inwardly of the ends of the roller. This may be expressed in the following geometrical relations:

$$R_i > R_{r1} > \overline{R_o} \qquad \text{I.}$$

$$R_{r2} < R_o \qquad \text{II.}$$

These conditions are satisfied by a roller having a profile provided by the arc of an ellipse having its minor axis at the roller median M.

The different roller profile radii have common tangents at their juncture with one another at points $X_1$ and $X_2$. In other words, the roller profile is characterized by the absence of any edges (lines of zero radius of curvature) or blended edges (areas of small radii of curvature much less than $R_{r1}$) anywhere along the roller profile.

The roller illustrated in FIG. 21 is an example of a profile having a non-increasing curvature, since the radius of curvature $R_{r2}$ of the profile adjacent the ends of the roller 15 is smaller than the radius of curvature $R_{r1}$ adjacent the roller reference datum M. In this embodiment, the roller reference datum M is located at the lengthwise median of the roller 15, and the roller 15 is symmetrical with respect to the reference datum. Thus, the roller 15 may be defined as being symmetrically crowned.

There may be applications in which an asymmetrically profiled roller is preferable to the symmetrically profiled roller described above. An example of the roller and raceway profiles in a bearing having an asymmetrically-profiled roller is illustrated in FIG. 22. In the present instance, the roller profile on opposite sides of a plane orthogonal to the longitudinal axis and containing the geometric center of the roller is non-symmetrical; that is, they are not mirror images of one another. As best seen therein, the roller 115 has a profile with a variable curvature comprising three different radii of curvature: $R_{r1}$, $R_{r2}$ and $R_{r3}$. The reference datum M is located closer to the right end of the roller 115 than to the left end thereof. The radius $R_{r1}$ *merges with the radius Rr2* at a location $X_1$ to the left of the reference datum M, and the radius $R_{r1}$ merges with the radius $R_{r3}$ at a location $X_2$ to the right of the reference datum M. The location $X_1$ is farther from the median M than the location $X_2$. As illustrated, the radius $R_{r1}$ is greater than the radii $R_{r2}$ and $R_{r3}$. Of course, the aforementioned relations of the profiles of the inner and outer raceways 112 and 114 also hold for the asymmetrically profiled roller bearing.

In accordance with the geometrical relations I and II set forth above, in both embodiments of the present invention the roller profile contacts the inner raceway profile at the roller median or reference datum M(X=0) under light load with a conformity ratio:

$$\frac{R1(X=0)}{R_i} < 1$$

which, for many spherical roller bearings, is about 0.98. It is known that as the load at the roller-inner raceway contact increases, pressure is distributed in a predetermined manner along the roller profile. For instance, between rollers and raceways of constant cruvature, the Hertzian pressure distribution is an elliptical function of X which may be expressed by the following equation:

$$\left(\frac{P(X)}{P(O)}\right)^2 + \left(\frac{X}{1e/2}\right)^2 = 1 \qquad \text{III.}$$

wherein P(X) is the pressure at a distance X from the contact center; P(O) is the pressure at the contact center; X is the distance from the contact center; and le/2 is the distance from the contact center to the end of the contact area. In the present invention, since the radius of curvature of the roller profile decreases with increasing X, roller material is removed (roller reduced in diameter) at an increasing rate as X increases away from the roller median. Thus, there exists a sharper drop in pressure as X increases than exists in the roller-raceway contact expressed in equation III. As a result, the pressure distribution at the inner raceway is more peaked than Hertzian. See FIGS. 20a and 20b.

According to the geometrical relations I and II, the roller profile does not contact the outer raceway at X=0 under light load. This is because at X=0, $R_{r1}/R_o > 1$; since the reciprocal $R_o/R_{r1} < 1$, an inverse crown effect exists. At locations $X_1$ and $X_2$, however, contact does occur at light load. At these locations the following conformities exist:

$$\frac{R(X_1)}{R_o} < 1; \frac{R(X_2)}{R_o} < 1.$$

The conformities may have predetermined values of about 0.98, as is customary for many spherical roller bearings. Thus, as the load increases, the contact areas around locations $X_1$ and $X_2$ increase and merge together around X=0 resulting in a pressure distribution which is defined as bimodal because of the pair of maximum pressure levels occurring on opposite sides of the contact center. See FIGS. 19a and 19b.

In view of the foregoing, it should be apparent that in the bearings of the present invention, the relation of the roller profile with the outer raceway remains the same even though the outer ring axis is not coaxial with the bearing axis. Thus, the bearings operate with their rollers at non-negative skew angles even when the inner and outer rings are misaligned, i.e. one or the other does not rotate about its geometrical axis. Moreover, since the roller profiles have variable curvatures, the inner ring can be manufactured readily with a constant radius of curvature by conventional methods.

There is illustrated in FIGS. 23 and 24 another embodiment of self-aligning roller bearing incorporating the skew control concepts of the present invention. As illustrated, the bearing comprises an inner ring 200 which in the present instance has a spherical inner raceway 202 and extended end portions 204 for securing the ring to a shaft member or the like 206. Outer ring segments 208 defining outer raceways 210 for the rollers 212 of each row are mounted in an annular member 214 which may in turn be seated in a housing or the like. The rollers 212 which are of generally hour-glass configuration are mounted between the confronting common inner raceway 202 and the outer raceways 210 defined by the outer rings. The bearing is held together by a collar 216 which is threadedly mounted on the interior of the outer annular member 214.

In accordance with this embodiment, and as illustrated particularly in FIG. 24 which is a simplified view of the geometrical relations present in the bearing incorporating skew control in accordance with the present invention, it may be seen that the two outer raceways have a constant radius of curvature $R'_o$ and the common inner raceway also has a constant radius of curvature $R'_i$. In the present instance, the radius of curvature $R'_o$ of the outer raceway is greater than the radius of curvature of the inner raceway $R'_i$. Each of the rollers has a profile with variable curvature, such that the radius of curvature of the roller increases as one proceeds from the center plane of the roller rowards either end. The curvature of the profile of the roller comprises radii of at least two different magnitudes wherein the minimum radius $R'_{r1}$ of curvature of the roller is greater than the radius of curvature $R'_i$ of the inner raceway and less than the radius of curvature $R'_o$ of the outer raceway and wherein the maximum radius of curvature $R'_{r2}$ of the roller is greater than the radius of curvature $R'_o$ of the outer raceway. Thus, the geometrical relations may be expressed as follows:

$R'_{r1} > R'_i$     I.

$R'_{r1} < R'_o < R'_{r2}$     II.

From the above, it may be observed that positive skew in bearings with barrel-shaped or hour-glass rollers is a function of certain geometrical relations between the roller profile and raceways. These relationships may be better understood by analyzing the contact between two bodies, each having a fixed profile radius which results in a pressure distribution termed elliptical. (See FIG. 25) If the contact length coordinate is x, the load per unit profile length is $P = f(x)$ and thus the normal contact force is $$P = p_o m_o = p_o \int_{(l)} \frac{p}{p_o} dx$$

and where $p_o$ is the maximum load per unit profile length the integral extends over the contact length "l". By selection of the origin for x one can always obtain $$m_1 = \int_{(l)} \frac{p}{p_o} x \, dx = 0$$

With that selection, the length of the contact is determined by the dispersion of the load distribution measured by $$p_o m_2 = p_o \int_{(l)} \frac{p}{p_o} x^2 dx$$

and the load distribution is described by $$p^2 = p_o^2 \left[ 1 - \left( \frac{x}{l} \right)^2 \right]$$

For this distribution $$p = \frac{\pi}{4} p_o$$

$$m_2 = \frac{\pi}{8} l^2$$

Defining $m_4 = \int_{(l)} \frac{p}{p_o} x^4 dx$ which for this distribution is $$m_4 = \frac{\pi}{16} l^4,$$

the quantity $\bar{K} = m_4/m_2^2$ is, for this distribution: $K = 4/\pi$ (Hertzian contact) Note K is independent of l.

$m_o$, $m_1$, $m_2$, and $m_4$ are moments of the respective order 0, 1, 2, and 4 of the normalized pressure distribution.

If the curvature of one of the contacting bodies varies with x, then the load distribution is no longer elliptical. The quantity K may then differ from the value given above.

Analysis shows that improved skew control is obtained if the roller profile is given a variable radius of curvature, so selected that, when combined with two races of differing but, for each, constant, curvature radii, the value K at the outer race contact ($K_o$) exceeds that at the inner race contact ($K_i$). As one example, this result, i.e. $K_o > K_i$ is achieved if, in a bearing with barrel-shaped rollers and a hollow sphere as the outer ring race (a) the outer race radius of curvature is less than the inner race radius of curvature, and (b) the roller radius of curvature decreases on either side of the center plane (M) of the roller or as x increases in absolute value.

For a bearing with hour-glass shaped rollers and a convex sphere as the inner ring race, $K_o > K_i$ is achieved if (a) the outer race radius of curvature is greater than the inner race radius of curvature, and (b) the roller radius of curvature increases on either side of the center plane (M) of the roller as the absolute value of x increases.

This arrangement produces a load distribution at the outer ring contact which may be flat topped or bimodal whereas at the inner race it may be peaked or unimodal.

While preferred embodiments of the present invention have been described in detail with regard to spherical roller bearings having symmetrically profiled rollers, various modifications, alterations and changes may be made without departing from the spirit and scope of the present invention as defined in the appended claims.

We claim:

1. In a bearing having inner and outer members with inner and outer raceways spaced apart to define a space therebetween, a complement of rolling elements rotatable about their axes in the space between the raceways, the improvement wherein at least one rolling element has a profile with a predetermined varying curvature, said inner and outer raceways having curvatures of constant radii, said rolling element profile producing a pressure distribution under load resulting in a residual frictional moment producing forces counteracting the externally applied axial load, said rolling elements having a skew angle when the axis of a rolling element and the axis of the bearing are not coplanar and said skew angle being positive when the friction force compnents arising in each contact between said rolling element and raceways and acting on said rolling element in the axial direction, are so directed that they are codirectional to the axial component of the normal contact force acting on said rolling element in the same contact, said rolling element profile curvature varying from a reference datum extending transversely to the axis of the rolling element and disposed adjacent the longitudinal median of the rolling element and wherein said inner and outer raceway curvatures of constant radii are finite.

2. In a bearing having inner and outer members with inner and outer raceways spaced apart to define a space therebetween, a complement of rolling elements rotatable about their axes in the space between the raceways, the improvement wherein at least one rolling element has a profile with a predetermined varying curvature, said inner and outer raceways having curvatures of constant radii, said rolling element profile producing a pressure distribution under load resulting in a residual frictional moment producing forces counteracting the externally applied axial load, said rolling elements having a skew angle when the axis of a rolling element and the axis of the bearing are not coplanar and said skew angle being positive when the friction force compnents arising in each contact between said rolling element and raceways and acting on said rolling element in the axial direction, are so directed that they are codirectional to the axial component of the normal contact force acting on said rolling element in the same contact said inner and outer raceway profiles being concave and wherein said rolling element profile curvature includes radii of convex curvature on opposite sides of said datum which are smaller than the radius of curvature of said rolling element profile adjacent said datum.

3. A bearing according to claim 2 wherein said reference datum is located at the longitudinal median of the rolling element.

4. A bearing according to claim 2 wherein adjacent different radii of convex curvature of said rolling element profile curvature merge together at common tangents.

5. A bearing according to claim 2 wherein said smaller radii of convex curvature of said rolling element are of different magnitudes.

6. In a bearing having inner and outer members with inner and outer raceways spaced apart to define a space therebetween, a complement of rolling elements rotatable about their axes in the space between the raceways, the improvement wherein at least one rolling element has a profile with a predetermined, varying curvature from a reference datum extending transversely to the axis of the rolling element, said inner and outer raceways having curvatures of constant radii of curvature, the radius of convex curvature of the portions of the roller profile outboard of said transverse reference datum and adjacent the ends of the roller being less than the radius of curvature of the outer raceway, the radius of curvature of the outer raceway profile being less than the radius of curvature of the roller profile adjacent said datum and the radius of curvature of the inner raceway profile exceeding the radius of curvature of the roller everywhere along its length, said rolling element profile producing a pressure distribution under load resulting in a residual frictional moment producing forces counteracting the externally applied load, said rolling elements having a skew angle when the axis of a rolling element and the axis of the bearing are not coplanar and said skew angle being positive when the friction force components arising in each contact between said rolling element and raceways and acting on said rolling element in the axial direction, are so directed that they are codirectional to the axial component of the normal contact force acting on said rolling element in the same contact.

7. In a bearing having inner and outer members with inner and outer raceways spaced apart to define a space therebetween, a complement of rolling elements rotatable about their axes in the space between the raceways, the improvement wherein at least one rolling element has a profile with a predetermined, varying curvature from a transverse reference datum extending perpendicular to the axis of the rolling element, said inner and outer raceways having curvatures of constant radii of curvature; the radius of concave curvature of the inner raceway profile being greater than the radius of concave curvature of the outer raceway profile, said roller profile radii having common tangents at their juncture with one another at points on opposite sides of said datum, said rolling element profile producing a pressure distribution under load resulting in a residual frictional moment producing forces counteracting the externally applied load, said rolling elements having a skew angle when the axis of a rolling element and the axis of the bearing are not coplanar and said skew angle being positive when the friction force components arising in each contact between said rolling element and raceways and acting on said rolling element in the axial direction, are so directed that they are codirectional to the axial component of the normal contact force acting on said rolling element in the same contact.

8. In a bearing having inner and outer members with inner and outer raceways spaced apart to define a space therebetween a complement of rolling elements rotatable about their axes in the space between the raceways, the improvement wherein at least one rolling element has a profile with a predetermined varying curvature said inner and outer raceways having curvatures of constant radii, said rolling element profile producing a pressure distribution under load resulting in a residual frictional moment producing forces counteracting the externally applied axial load, said rolling elements having a skew angle when the axis of a rolling element and the axis of the bearing are not coplanar and said skew angle being positive when the friction force components arising in each contract between said rolling element and raceways and acting on said rolling element in the axial direction, are so directed that they are codirectional to the axial component of the normal contact force acting on said rolling element in the same contact, said inner and outer ring raceway profiles being concave arcs having radii of curvatures $R_i$ and $R_o$ respectively and said roller profile has a minimum radius of convex curvature $R_{r2}$ and a maximum radius of concave curvature $R_{r1}$ and wherein the geometrical relationships of the various radii are as follows: $R_{r2} < R_o < R_{r1} < R_i$.

9. A bearing according to claim 8 wherein said maximum radius of curvature of said rolling element profile is located adjacent the datum and the minimum radius of curvature of said rolling element profile is located outboard of said datum on opposite sides thereof.

* * * * *